(12) United States Patent
Kyu-seok et al.

(10) Patent No.: US 6,350,522 B1
(45) Date of Patent: Feb. 26, 2002

(54) COMPOSITION FOR IMAGE RECEIVING LAYER AND POLYMER FILM HAVING THE IMAGE RECEIVING LAYER FORMED THEREFROM

(75) Inventors: Kim Kyu-seok, Seoul; Jeong Tae-houng, Suwon, both of (KR)

(73) Assignee: SKC Co., Ltd., Suwon (KR)

( * ) Notice: Subject to any disclaimer, the term of this patent is extended or adjusted under 35 U.S.C. 154(b) by 0 days.

(21) Appl. No.: 09/490,276

(22) Filed: Jan. 24, 2000

(30) Foreign Application Priority Data

Jan. 22, 1999 (KR) .............................................. 99-1939
Dec. 16, 1999 (KR) ............................................ 99-58272

(51) Int. Cl.$^7$ .............................................. B32B 27/36
(52) U.S. Cl. ........................ 428/412; 428/195; 428/206; 428/327; 428/336; 428/402; 428/419; 428/518; 428/520; 430/281; 430/286
(58) Field of Search ................................ 428/323, 402, 428/412, 419, 336, 195, 206, 218, 520; 430/281, 286

(56) References Cited

U.S. PATENT DOCUMENTS

| | | | | |
|---|---|---|---|---|
| 4,873,135 A | * | 10/1989 | Wittnebel et al. | ............ 428/192 |
| 5,137,773 A | * | 8/1992 | Malhotra et al. | ............ 428/215 |
| 5,310,531 A | * | 5/1994 | Dodge | ......................... 428/185 |

\* cited by examiner

*Primary Examiner*—Leszek Kiliman
(74) *Attorney, Agent, or Firm*—Nixon & Vanderhye P.C.; Frank P. Presta

(57) ABSTRACT

A composition for an image receiving layer including 2 to 20% by weight of a thermoplastic copolymer containing methylmethacrylate residue and butylacrylate residue, 0.1 to 10% by weight of a heat-curable polymer capable of forming a cross link with the thermoplastic copolymer, 0.01 to 0.5% by weight of a reactive silicon-based slipping agent having at least one functional group selected from the group consisting of a conjugate double bond, a free hydrogen group bonded with silicon (Si—H), an amino group and a hydroxy group, 0.01 to 0.5% by weight of a fluorine-based anionic surfactant, and remainder of water.

19 Claims, No Drawings

COMPOSITION FOR IMAGE RECEIVING LAYER AND POLYMER FILM HAVING THE IMAGE RECEIVING LAYER FORMED THEREFROM

BACKGROUND OF THE INVENTION

1. Field of the Invention

The present invention relates to a composition for forming an image receiving layer and a polymer film for copying having the image receiving layer formed using the composition, and more particularly, to a composition for an image receiving layer capable of forming an image receiving layer having excellent toner adhesion properties, excellent antistatic properties, a low coefficient of friction, excellent anti-blocking properties and a pleasing appearance, and a polymer film for copying formed using the composition.

2. Description of the Related Art

In order for an overhead projector (OHP) to be used in an actual state, first, an image such as characters or pictures should be first formed on a transparent or semi-transparent polymer film using a copier.

As is well known, in a conventional electrophotographic photocopier, a toner image is formed in five steps as follows.

(1) A drum coated with a photoconductive material such as selenium passes under a series of corona discharge shims in a dark room so that the surface of the drum is positively or negatively charged electrostatically.

(2) The charged drum is exposed via a lens system having a reproduced image to form an electrostatic latent image on the surface of the charged drum, that is, charges on an exposed region of the drum are dispersed through a conductive support member while charges on an unexposed region of the drum remain largely intact on the surface of the drum to form the electrostatic latent image.

(3) When oppositely charged toner particles are brought into contact with the surface of the drum, the toner particles on the charged area of the surface of the drum cling thereto by electrostatic attraction.

(4) When an image receiving polymer film passes between the drum and a transfer corona discharge shim, the toner particles are transferred to the polymer film.

(5) The transferred toner particles are fused to the polymer film by application of heat and/or pressure.

There exist known numerous kinds of copiers capable of forming an image on a transparent or semi-transparent polymer film by the above-described electrophotographic copying process. The polymer films used for these copiers must be essentially equipped with desirable characteristics, including toner adhesion properties, excellent antistatic property for suppressing copy degradation during continuous copying, due to static charge buildup on a film substrate, a low friction coefficient for minimizing multiplex transfer (that is, a phenomenon in which multiple overlapping films may be simultaneously transferred) and jamming (that is, a phenomenon in which a copying process is interrupted when a film jams into a copier) during continuous copying, and an anti-blocking property, which is for avoiding multiplex transfer or jamming when a film is to be kept for a long time or during a continuous copying process.

The following prior art U.S. patents were provided: U.S. Pat. No. 3,854,942, which discloses that a mixture of a vinyl chloride-acetate copolymer and an acrylic resin is coated on a polymer film substrate; and U.S. Pat. No. 4,370,379, which discloses that a mixture of an acrylic resin and a polyester is coated on a polymer film substrate. However, both technologies have a limit in toner adhesion properties. In particular, in both technologies, the toner adhesion properties are not satisfactory during a high-temperature continuous copying process. Even in the case where polyvinyl acetate, polymethyl methacrylate and a polyester are appropriately combined, as taught in U.S. Pat. No. 4,873,135, the adhesion properties do not exceed a constant level with respect to various kinds of toners. Thus, in this case, a separate primer layer must be formed, which is a cumbersome task.

In the case where a terpolymer of vinyl halide, a vinyl ester of a saturated aliphatic carboxylic acid and functional group-containing unsaturated termonomer is used as an image receiving layer, as disclosed in U.S. Pat. No. 4,891,285, or in the case where a coating composition comprised of a mixture of (a) non ionic celluloses or blends thereof; (b) ionic celluloses or blends thereof; (c) poly(alkylene oxide); and (d) a noncellulose component, as disclosed in U.S. Pat. No. 5,137,773, the antistatic effect is poor so that polymer films accumulating on a tray after a continuous copying process, may cling to one another by static electricity, and thus, not to be put in order. In Japanese Laid-Open Publication No. sho 51-34734; U.S. Pat. Nos. 3,854,942; 4,071,362; 4,415,626; and 4,489,122, there is disclosed a method for preventing the generation of static electricity using an antistatic agent. However, the use of an antistatic agent having a marked mobility as the time passes causes the following problem. That is, toner adhesion properties are deteriorated so that a loss in the image may be caused during handling of the copied polymer film. Also, during stacking, the antistatic agent may be transferred to an adjacent polymer film so that an uncopied region may be produced. Further, since the antistatic agent does not have sufficient miscibility with polymer resin, it cannot exert an antistatic effect, which makes it impossible for the antistatic agent to prevent multiplex transfer or jam.

U.S. Pat. Nos. 4,480,003 and 4,585,730 are directed to improvements in antistatic properties and changes in antistatic property over time, by using a conductive polymer. However, the conductive polymer used is expensive and a large amount thereof must be injected compared to the antistatic agent.

If the coefficient of friction of a polymer film for receiving an image is high, multiplex transfer or jamming is liable to occur. To overcome this problem, in U.S. Pat. No. 5,310,591, there is disclosed the use of a slipping agent. However, if a material having a low surface tension is used as the slipping agent, toner adhesion properties are severely deteriorated. Also, fine cratering may be formed on the surface of a substrate, which may impair film appearance.

In addition to a toner receiving binder, an antistatic agent, a slipping agent, a catalyst and the like, which are added to a coating layer of a polymer film for electrophotographic copier, may cause a blocking phenomenon, resulting in several problems such as multiplex transfer or jam.

These problems must be overcome by polymer films for electrophotographic copiers. In U.S. Pat. No. 3,618,742, paper is added so that a polymer film is smoothly carried in a copier. Although adding the paper suppresses an increase in the charge on the surface of the polymer film, the paper increases the cost and the amount of waste.

As described above, the conventional polymer film for use in an electrophotographic copying process cannot suffice toner adhesion properties, antistatic properties, a low coefficient of friction, excellent anti-blocking properties and the like at the same time.

SUMMARY OF THE INVENTION

In view of the above, it is an objective of the present invention to provide a composition for an image receiving layer capable of forming an image receiving layer having excellent toner adhesion properties, an excellent antistatic property, a low coefficient of friction, excellent anti-blocking properties and a pleasing appearance.

It is another objective of the present invention to provide a polymer film for copying having an image receiving layer having excellent toner adhesion properties, excellent antistatic properties, a low coefficient of friction, excellent anti-blocking properties and a pleasing appearance.

Accordingly, to achieve the first objective, there is provided a composition for an image receiving layer including 2 to 20% by weight of a thermoplastic copolymer containing methylmethacrylate residue and butylacrylate residue, 0.1 to 10% by weight of a heat-curable polymer capable of forming a cross link with the thermoplastic copolymer, 0.01 to 0.5% by weight of a reactive silicon-based slipping agent having at least one functional group selected from the group consisting of a conjugate double bond, a free hydrogen group bonded with silicon (Si—H), an amino group and a hydroxy group, 0.01 to 0.5% by weight of a fluorine-based anionic surfactant, and remainder of water.

In the present invention, the composition may further include 0.01 to 5% by weight of an antistatic agent having at least one functional group selected from the group consisting of an alkoxy group, a hydroxy group, an amino group and a conjugate double bond, based on the total weight of the composition.

Here, the thermoplastic copolymer preferably contains 90 mol % or more of the methylmethacrylate residue and the butylacrylate residue in its molecular structure.

Also, the composition preferably further include 0.05 to 5% by weight of cross-linked polymethylmethacrylate having an average particle diameter of 2 to 15 μm as a surface-roughening agent, based on the total weight of the composition.

Here, the thermoplastic copolymer preferably contains 20 to 60 mol % of the methylmethacrylate residue and the butylacrylate residue in its molecular structure, and the content of the heat-curable polymer is preferably in the range of 5 to 40% by weight based on the weight of the thermoplastic copolymer.

Further, the thermoplastic copolymer preferably contains 1 to 10 mol % of one residue selected from the group consisting of acrylamide residue, hydroxyethylmethacrylate residue and acrylic acid residue, in addition to the methylmethacrylate residue and the butylacrylate residue, in its molecular structure.

Also, the heat-curable polymer preferably contains at least one functional group selected from the group consisting of an alkoxy group, a hydroxy group, an amino group, a amide group, a cyano group and a water-soluble blocked isocyanate group, and the heat-curable polymer is preferably at least one selected from the group consisting of a melamine-formaldehyde resin, a urea-formaldehyde resin and a water-soluble blocked diisocyanate resin.

To achieve the second objective, there is provided a polymer film including a polymer film substrate, and an image receiving layer including 25 to 85% by weight of a thermoplastic copolymer containing methylmethacrylate residue and butylacrylate residue, 5 to 50% by weight of a heat-curable polymer capable of forming a cross link with the thermoplastic copolymer, 0.1 to 10% by weight of a reactive silicon-based slipping agent having at least one functional group selected from the group consisting of a conjugate double bond, a free hydrogen group bonded with silicon (Si—H), an amino group, and a hydroxy group and 0.1 to 10% by weight of a fluorine-based anionic surfactant.

The polymer film may further include 15 to 30% by weight of an antistatic agent having at least one functional group selected from the group consisting of an alkoxy group, a hydroxy group, an amino group and a conjugate double bond, based on the total weight of the composition.

In the polymer film according to the present invention, the thermoplastic copolymer preferably contains 90 mol % or more of the methylmethacrylate residue and the butylacrylate residue in its molecular structure.

Also, the polymer film may further include 0.3 to 3% by weight of cross-linked polymethylmethacrylate having an average particle diameter of 2 to 15 μm as a surface-roughening agent, based on the total weight of the composition.

In the polymer film, the thermoplastic copolymer preferably contains 20 to 60 mol % of the methylmethacrylate residue and the butylacrylate residue in its molecular structure.

Here, the content of the heat-curable polymer is preferably in the range of 5 to 40% by weight based on the weight of the thermoplastic copolymer. Further, the thermoplastic copolymer preferably contains 1 to 10 mol % of one residue selected from the group consisting of acrylamide residue, hydroxyethylmethacrylate residue and acrylic acid residue, in addition to the methylmethacrylate residue and the butylacrylate residue, in its molecular structure. Also, the heat-curable polymer preferably contains at least one functional group selected from the group consisting of an alkoxy group, a hydroxy group, an amino group, an amide group, a cyano group and a water-soluble blocked isocyanate group, and the heat-curable polymer is preferably at least one selected from the group consisting of a melamine-formaldehyde resin, a urea-formaldehyde resin and a water-soluble blocked diisocyanate resin. Here, the polymer film substrate is preferably at least one selected from the group consisting of a polyester film, a polycarbonate film, a polyimide film, a polysulfone film and cellulose trivinylacetate film.

The composition for an image receiving layer according to the present invention can form an image receiving layer having excellent toner adhesion properties, excellent antistatic properties, a low coefficient of friction, excellent anti-blocking properties and a pleasing appearance. Also, since the composition for the image receiving layer is a water-based composition, it is economical and can completely eliminate problems such as environmental pollution which may be caused in the case of using an organic solvent, threatening an operator's health or danger of fire. Thus, the polymer film having the image receiving layer formed from the composition has excellent toner adhesion properties, excellent antistatic properties, a low coefficient of friction, excellent anti-blocking properties and a pleasing appearance.

DESCRIPTION OF THE PREFERRED EMBODIMENTS

A composition for an image receiving layer according to the present invention and a polymer film having the image receiving layer formed from the composition will now be described in detail.

The feature of the composition for an image receiving layer according to the present invention lies in that water is used as a medium. Thus, all components of the composition of the present invention must be soluble or dispersible in water. The composition according to the present invention contains a thermoplastic copolymer which imparts adhesion to a toner, dye, pigment, ink and the like, for forming an image, which will be generally referred to as "toner", a heat-curable polymer, a slipping agent, a surfactant for preventing a cratering phenomenon, a catalyst and water as a medium. Also, the composition of the present invention may further include an antistatic agent, or an additive such as a surface-roughening agent.

A polymer film substrate on which the composition for an image receiving layer according to the present invention is coated must be equipped with flexibility, thermal stability and transparency suitable for use in overhead projectors. In other words, the polymer film substrate must be capable of transmitting visible rays and must have thermal stability as high as 120 to 200° C. enough to withstand image fusion in a copier. Examples of polymer film substrates having such properties include polyester films, cellulose triacetate films, polyimide films, polycarbonate films, polysulfone films and the like. Preferred polymer film substrates are polyester films and more preferred ones are two-axially oriented polyethyleneterephthalate (PET) films. The thickness of the polymer film substrate is preferably 50 to 200 μm.

The image receiving layer formed on the polymer film substrate also must transmit visible rays and must exhibit a low coefficient of friction between an adjacent polymer film and the surface of a transfer path in a copier. Also, the image receiving layer must be high in resistance against fingerprints or scratches. Examples of the material for forming the image receiving layer having such characteristics include polyester resin, cellulose resin, polyvinyl acetate resin, polyvinyl chloride resin, acrylonitrile-butadiene-styrene (ABS) copolymer resin, polyvinylliden chloride resin, polyurethane resin, polymethacrylate resin, polymethylmethacrylate resin and the like. In the composition of the present invention, in order to improve toner adhesion properties, water-soluble thermoplastic copolymer is combined with a heat-curable polymer.

The main component of the thermoplastic copolymer used in the composition for an image receiving layer of the present invention is a copolymer of a methylmethacrylate and butylacrylate, which is a binder having an excellent compatibility with various toners. In particular, the copolymer has an excellent adhesion property to a PET film so as to form an image receiving layer directly on a film substrate made of a material such as PET without a primer layer. The weight-average molecular weight of the copolymer is preferably in the range of 50,000 to 500,000. Methylmethacrylate serves to strengthen a coating layer during formation of the coating layer, while butylacrylate serves to enhance toner adhesion properties.

Thus, it is very important to copolymerize two monomers in an appropriate combination ratio. If methylmethacrylate is excessive, the toner adhesion properties are poor while the hardness of the coating layer is increased. If butylacrylate is excessive, the hardness of the coating layer is poor while the toner adhesion properties are excellent. Thus, in the latter case when the film is kept for a long time, blocking may be caused. Otherwise, multiplex transfer may be caused during a continuous copying process.

The thermoplastic copolymer preferably has 20 to 60 mol % of butylacrylate residue, more preferably 40 to 50 mol %.

When methylmethacrylate and butylacrylate are copolymerized, a thermoplastic copolymer obtained by adding small amounts of acrylamide, hydroxyethylmethacrylate and acrylic acid is cross-linked with a heat-curable polymer to greatly increase the hardness of a coating layer and improve toner adhesion properties. The contents of acrylamide, hydroxyethylmethacrylate and acrylic acid in the polymerization reactant mixture are preferably set such that at least one residue selected from the group consisting of acrylamide residue, hydroxyethylmethacrylate residue and acrylic acid residue is contained in an amount of 1 to 10 mol %, most preferably 5 to 7 mol % in the thermoplastic copolymer.

The thermoplastic copolymer is used as a component of the composition of the present invention together with an emulsion-copolymerization medium without an extra process for separating the copolymer after emulsion-copolymerization. It is preferable that acrylamide, hydroxyethylmethacrylate and acrylic acid are injected late in the stage of emulsion-copolymerization of methylmethacrylate and butylacrylate rather than in an initial stage thereof. This is for increasing the reactivity of emulsion-copolymerization by aligning acrylamide, hydroxyethylmethacrylate and acrylic acid outside the emulsion micelle.

The heat-curable polymer which can be used in the composition for an image receiving layer according to the present invention is one capable of forming a cross-linked structure with the above-described thermoplastic copolymer. Such a heat-curable polymer preferably has at least one functional group selected from the group consisting of an alkoxy group, a hydroxy group, an amino group, an amide group, a cyano group and a water-soluble blocked isocyanate group, in the repeating units of its molecular structure. Specifically, melamine-formaldehyde resin, urea-formaldehyde resin or water-soluble blocked diisocyanate resin is more preferred.

The content of the heat-curable polymer is appropriately adjusted according to the molecular weight and the number of functional groups. In the case of melamine-formaldehyde resin, the content of the heat-curable polymer is preferably in the range of 5 to 40% by weight based on the weight of the thermoplastic copolymer, more preferably 20 to 25% by weight. The melamine-formaldehyde resin is dissolved well in water and reacts with the thermoplastic copolymer, thereby forming excellent cross-linked structure.

In the composition of the present invention, in order to promote the reaction between the thermoplastic copolymer and the heat-curable polymer, a reaction catalyst may be added. In the case of using melamine-formaldehyde resin or urea-formaldehyde resin as a heat-curable polymer, acid or latent acid is preferably used as the reaction catalyst. Also, in the case of using water-soluble blocked diisocyanate resin as a heat-curable polymer, an organic tin compound or an organic manganese compound is preferably used as the reaction catalyst. The amount of the reaction catalyst added is appropriately adjusted according to film forming conditions or film drying conditions, that is, a drying temperature, a drying time, the amount of ventilation and the like, preferably 0.01 to 1% by weight based on the total weight of solid matter contained in the composition for an image receiving layer. However, if the film forming or drying conditions are severe, cross-linking reaction between a thermoplastic copolymer and a heat-curable polymer may occur without using the reaction catalyst.

The polymer film having an image receiving layer formed from the composition of the present invention preferably has an excellent antistatic property. If the antistatic property of the polymer film is poor, films cling to each other due to static electricity generated by friction between films or necessarily accompanied when an image is formed by a toner, thereby disabling the smooth carriage of the films in a copier.

In order to avoid such problems, the polymer film preferably has surface resistivity of $10^9$ to $10^{12}$ Ω/□. However, in many cases, use of an antistatic agent may cause various types of adverse effects. Examples of the adverse effects include compatibility with a composition for an image receiving layer, deterioration in the toner adhesion and poor water resisting qualities. In addition, the antistatic agent may deteriorate toner adhesion properties and may make the appearance of the film hazy, due to its migration onto the film surface as time passes after it has been coated on a film substrate. In order to solve the problem caused by the antistatic agent due to the change over time, it is widely known to use a conductive polymer as an antistatic agent or to use a polymer-type antistatic agent. However, conductive polymers are expensive, and a large amount of a polymer-type antistatic agent must be injected for attaining a desirable antistatic effect.

Surprisingly, the composition for an image receiving layer of the present invention can form an image receiving layer having excellent toner adhesion properties, excellent antistatic properties, a low coefficient of friction, excellent anti-blocking properties and a pleasing appearance, without using an antistatic agent. Though, in order to further increase such properties, the composition of the present invention may further include a specially selected antistatic agent.

The special antistatic agent used in the present invention is characterized by having functional groups. In other words, in the case of using melamine-formaldehyde resin or urea-formaldehyde resin as the heat-curable polymer, an antistatic agent having at least one functional group selected from the group consisting of an alkoxy group, a hydroxy group, an amino group and a conjugate double bond, or a mixture thereof may preferably used. In the case of using water-soluble blocked diisocyanate resin as the heat-curable polymer, an antistatic agent having at least one functional group selected from the group consisting of a hydroxy group and an amino group, or a mixture thereof may be used.

The special antistatic agent exists as a part of the image receiving layer via a chemical bond since it reacts with a heat-curable polymer entirely or partially under curing conditions of the composition. Thus, deterioration in toner adhesion properties, which may be caused by addition of a conventional antistatic agent, can be prevented. At the same time, problems including lowered adhesion properties according to the passing of time, lowered anti-blocking properties or poor appearance can be solved.

In order to enhance the chemical reaction efficiency between the antistatic agent and the heat-curable polymer, an appropriate catalyst can be added according to film forming conditions or film drying conditions. In the cases of using melamine-formaldehyde resin or urea-formaldehyde resin as a heat-curable polymer and using a material containing at least one functional group selected from the group consisting of a hydroxy group, a carboxyl group and an amino group as the antistatic agent, acid or latent acid is preferably used as the catalyst. Also, in the cases of using water-soluble blocked diisocyanate resin as the heat-curable polymer and using a material containing at least one functional group selected from the group consisting of a hydroxy group and an amino group as the antistatic agent, an organic tin compound or an organic manganese compound is preferably used as the catalyst. In the cases of using melamine-formaldehyde resin or urea-formaldehyde resin as the heat-curable polymer and using a material containing a conjugate double bond as the antistatic agent, a Lewis acid compound can be used as the catalyst, specifically a platinum-based organic compound.

The contents of these reaction catalysts added are preferably 0.01 to 1% by weight based on the total weight of solid matter contained in the composition for an image receiving layer. However, if the film forming or drying conditions are severe, a sufficiently activated reaction between the thermoplastic copolymer and the heat-curable polymer can be induced without using the reaction catalyst.

In the case where a continuous copying process is performed using a polymer film having a large coefficient of friction, multiplex transfer or jamming may occur. To overcome this problem, in the prior art composition for an image receiving layer using an organic solvent, a general silicon oil as a slipping agent which can be dissolved in the organic solvent to reduce the coefficient of friction.

However, the general silicon oil is not at all compatible with an aqueous medium of the composition according to the present invention. As the slipping agent for an aqueous system, polyolefin-based emulsion, silicon-based compound emulsion or fluoride-based compound emulsion can be used. However, these general emulsion-type slipping agents have extremely low surface tensions. Thus, during formation of an image receiving layer, the slipping agent may exist in the form in which it is separated from the image receiving layer formed by the thermoplastic copolymer or the heat-curable polymer. Even if the slipping agent is bonded with the image receiving layer, the bonding force is weak so that the toner adhesion properties are unavoidably lowered.

To solve these problems, in the composition for an image receiving layer according to the present invention, 0.01 to 0.5% by weight of a reactive silicon-based slipping agent capable of forming a chemical bond with the thermoplastic copolymer and/or the heat-curable polymer based on the total weight of the composition, is used, thereby attaining a low coefficient of friction and excellent toner adhesion properties.

In the case of using melamine-formaldehyde resin or urea-formaldehyde resin as the heat-curable polymer, a slipping agent having at least one functional group selected from the group consisting of a conjugate double bond and a free hydrogen bonded with silicon (Si—H), or a mixture thereof, can be used. In this case, a Lewis acid, specifically a platinum-based organometallic compound, can be used as a catalyst. However, if the film forming or drying conditions are severe, a desired effect can be achieved without using the catalyst.

In the case of using water-soluble blocked diisocyanate resin as the heat-curable polymer, a slipping agent having at least one functional group selected from the group consisting of an amino group and a hydroxy group, or a mixture thereof, can be used. In this case, an organic tin compound or an organic manganese compound is preferably used as a catalyst. However, if the film forming or drying conditions are severe, a desired effect can be achieved without using the catalyst.

In the case of adding a catalyst to the composition for an image receiving layer according to the present invention, the amount of the catalyst added is preferably 0.01 to 5% by weight based on the total weight of solid matter contained in the slipping agent. In such a manner, a desired coefficient of friction can be attained so that smooth transfer of polymer films can be assured in a copier. Also, deterioration in the toner adhesion properties caused by using the slipping agent can be overcome.

The reactive silicon-based slipping agent emulsion is largely in a liquid phase before being dried. Also, since the silicon-based slipping agent has a very low surface tension, the slipping agent emulsion molecules tend to coalesce with one another in the composition for an image receiving layer. As the liquid slipping agent molecules coalesce, they grow into an oil droplet. Thus, when the image receiving layer is dried, the ambient moisture is repulsed to the outside of the coalesced oil droplet comprised of the slipping agent. Accordingly, fine polka dots are formed on the surface of the image receiving layer, which is called a cratering phenomenon. In order to avoid the cratering phenomenon, a material having a lower surface tension than the silicon-based slipping agent may be added as an additive and then aligned on the surface of the silicon-based slipping agent. Then, electrostatic repulsion is induced between the additives, thereby preventing coalescence between the silicon-based slipping agent.

The most suitable additive is a fluorine-based anionic surfactant. Since the fluoride-based anionic surfactant has a low surface tension in a fluoride part thereof, it is aligned well on the surface of the silicon-based slipping agent. Also, since the surfactant has a negative ionic property, after it is aligned on the surface of the silicon-based slipping agent, electrostatic repulsion is induced between the silicon-based slipping agent emulsions, thereby preventing coalescence of the silicon-based slipping agent emulsions.

The content of the fluorine-based anionic surfactant is preferably adjusted to be in the range of 0.01 to 0.5% by weight based on the total weight of the composition for an image receiving layer of the present invention. If the content of the fluorine-based anionic surfactant is less than 0.01% by weight, the above-described effects are difficult to achieve. If the content of the fluorine-based anionic surfactant is greater than 0.5% by weight, the surface of the image receiving layer becomes sticky or the appearance of the polymer film becomes hazy due to the migration of the fluorine-based anionic surfactant toward the surface of the polymer film with the passing of time.

As described above, a slipping agent, a surfactant, an antistatic agent, a catalyst and the like may be further added to the image receiving layer in addition to a binder resin for imparting adhesion properties to a toner. However, addition of these materials is liable to cause a blocking phenomenon between polymer films. The blocking phenomenon causes multiplex transfer of polymer films or jamming in a copier.

Therefore, in order to prevent the blocking by roughening the surface of the image receiving layer in forming an image receiving layer, spherical polymethylmethacrylate (PMMA) having an internal cross-linked structure is added to the composition for an image receiving layer according to the present invention. The cross-linkage is easily introduced into the structure of PMMA by the use of multi-functional monomers during a dispersion polymerization process. The thus-prepared cross-linked PMMA has spherical particles and is not easily deformed by external force. The average particle diameter of the cross-linked PMMA as a surface-roughening agent is suitably 2 to 15 μm in terms of anti-blocking properties. In the case where the composition of the present invention is coated using a meyer bar, great consideration must be taken in the selection of a meyer bar in view of the size of the cross-linked PMMA as a surface-roughening agent. The added surface-roughening agent may be held on the surface of the meyer bar to cause scratches on the surface of a polymer film substrate during a coating process. Thus, in the case of using a surface-roughening agent having an average particle diameter of 5 μm or greater, it is preferred that the thickness of a piano wire wound around the meyer bar is 100 μm or greater.

The surface-roughening agent introduced into the image receiving layer in such a manner not only prevents the blocking phenomenon between polymer films according to the present invention but also affects the touch user feels when he or she grabs the polymer film. Thus, the amount of the surface-roughening agent added must be determined in collective consideration of occurrence of blocking, the touch of polymer films, a draw ratio during a film forming process, a deviation in the equipment used and the like. However, a desired effect can be attained by the use of substantially 0.05 to 5% by weight of the surface-roughening agent, based on the total weight of the composition for an image receiving layer according to the present invention.

If the composition for an image receiving layer according to the present invention is coated on a polymer film substrate and then cured, an image receiving layer having excellent toner adhesion properties, and increased hardness of the image receiving layer accompanied with a cross linked structure (leading to excellent resistance to scratches), can be formed.

Now, a method for forming a polymer film according to the present invention by coating the composition of the present invention on a polymer film substrate will be described.

By adopting any conventional coating methods known to the one skilled in the art, the composition for an image receiving layer of the present invention can be coated on a polymer film substrate, thereby obtaining the polymer film according to the present invention. In the present invention, an image receiving layer can be formed on a polymer film substrate by coating the composition for an image receiving layer on one surface of or both surfaces of the polymer film substrate before drawing process along the machine direction, the drawing process along the machine direction and the drawing process along the direction perpendicular to the machine direction, or between the drawing process along the direction perpendicular to the machine direction and film winding process during a film forming process of the polymer film substrate. Additionally, an image receiving layer can be formed on a polymer film substrate by coating the composition for an image receiving layer on one surface of or both surfaces of the polymer film substrate during rewinding of the wound polymer film substrate after completing the process of forming the two-axially drawn polymer film substrate.

Here, as the polymer film substrates, as described above, a polyester film, a cellulose triacetate film, a polyimide film, a polycarbonate film, or a polysulfone film is preferably used. It is preferred that the coating amount of the composition for an image receiving layer is adjusted to be in the range of 0.1 to 2.0 g/m$^3$, in terms of various physical properties of the polymer film for copying.

Now, the present invention will be described in more detail with reference to illustrative examples. However, the invention is not limited to the following examples. In the examples and comparative examples of the present invention, evaluation of various performances of the formed film was made in the following manner.

(1) Toner Adhesion Property

A toner adhesion property was evaluated by an ASTM D3359 method as below.

A toner image was formed on the surface of a polymer film using two types of copiers (Xerox VIVACE 500 and 550). A cross-cut region was formed on the polymer film. Cellophane tape was superposed onto the cross-cut region on the polymer film and was then exfoliated. Then, the shape of the toner image remaining on the cross-cut region of the polymer film without being exfoliated, was compared with an index to measure the toner adhesion.

The toner adhesion is indicated by integers of 0 to 5. A larger number indicates that the toner adhesion is more excellent.

(2) Hardness of Image Receiving Layer

The surface of the image receiving layer formed on the polymer film was rubbed using a general swab and the number of rubbings was measured until the image receiving layer began to be exfoliated was measured. The evaluation results were as follows:

◎: more than 11 times; ○: 6 to 10 times; and x: less than 5 times.

(3) Surface Resistivity

The polymer film was left for over 30 minutes under the conditions of a temperature of 25° C. and a relative humidity of 50%, and then the surface resistivity was measured using a TREK MODEL 150.

(4) Coefficient of Friction

The polymer film was left for over 30 minutes under the conditions of a temperature of 25° C. and a relative humidity of 50%, and then static and dynamic coefficients of friction were measured using an AIKHO MODEL 4002.

(5) Anti-blocking Property 20 sheets of polymer films whose two surfaces were coated with a composition for an image receiving layer were superposed, and a pressure of 390 Kg/m$^2$ was applied thereto and then the sheets were kept at a temperature of 80° C. for 48 hours. The polymer film sheets were detached one by one to observe occurrence of blocking. The evaluation results were as follows:

Good: No blocking occurred;

Fair: Blocking occurred in 1 to 5 sheets; and

Poor: Blocking occurred in over 6 sheets.

(6) Transfer Performance 100 sheets of polymer films were continuously copied using the Xerox VIVACE 550 copier under the conditions of a temperature of 25° C. and a relative humidity of 50%, the number of occurrences of multiplex transfer and the number of occurrences of jamming were counted.

(7) Appearance of Polymer Film

Generation of fine polka dots due to a cratering phenomenon, was observed.

Synthesis of Thermoplastic Copolymer a 160 g of deionized water and 6.75 g of sodium laurylsulfate were put into a four-neck flask in which a reflux condenser, a stirrer, a thermometer and a nitrogen inlet apparatus were mounted, and stirred under a nitrogen atmosphere while maintaining the temperature at 90° C. 90 g of methylmethacrylate and 45 g of butylacrylate were mixed and the mixture was added to the flask using a dropping funnel over a time period of 10 to 15 minutes. After the flask was maintained at a constant temperature of 90° C., 20.25 g of 2% aqueous potassiumpersulfate solution was continuously poured into the flask over a time period of 30 minutes using the dropping funnel. After 4 hours, the reaction was completed. Here, the solid concentration was over 40%. After the solid concentration was measured, the deionized water was added to adjust the solid concentration to be 40%.

Synthesis of Thermoplastic Copolymer b 160 g of deionized water and 6.75 g of sodium laurylsulfate were put into a four-neck flask in which a reflux condenser, a stirrer, a thermometer and a nitrogen inlet apparatus were mounted, and stirred under a nitrogen atmosphere while maintaining the temperature at 90° C. 83 g of methylmethacrylate, 41 g of butylacrylate, 7 g of acrylamide, 2 g of hydroxymethylmethacrylate and 2 g of acrylic acid were mixed and the mixture was added to the flask using a dropping funnel over a time period of 10 to 15 minutes. After the temperature of the flask was maintained constant at 9020.25 g of 2% aqueous potassium persulfate solution was continuously poured into the flask over a time period of 30 minutes using the dropping funnel. After 4 hours, the reaction was completed and the amount of the deionized water added was adjusted according to the solid concentration so that the solid concentration becomes 40%.

Synthesis of Thermoplastic Copolymer c 160 g of deionized water and 6.75 g of sodium laurylsulfate were put into a four-neck flask in which a reflux condenser, a stirrer, a thermometer and a nitrogen inlet apparatus are mounted, and stirred under a nitrogen atmosphere while maintaining a temperature at 90° C. 83 g of methylmethacrylate and 41 g of butylacrylate were mixed and the mixture was added to the flask using a dropping funnel over a time period of 10 to 15 minutes. After the temperature of the flask was maintained at a constant temperature of 90° C., 20.25 g of 2% aqueous potassium persulfate solution was continuously poured into the flask over a time period of 30 minutes using the dropping funnel. 1 hour after since the reaction reached the maximum point of the exothermic reaction, 7 g of acrylamide, 3 g of hydroxymethylmethacrylate and 1 g of acrylic acid were mixed and then the mixture was poured into the flask using the dropping funnel over a time period of 15 minutes. Then, 4 g of 2% aqueous potassium persulfate solution was poured into the flask in the same manner as above. After 2 hours, the reaction was completed and the amount of the deionized water added was adjusted according to the solid concentration so that the solid concentration becomes 40%.

EXAMPLE 1

The composition for an image receiving layer was prepared by homogeneously mixing 12% by weight of emulsion (solid concentration 40%) of the thermoplastic copolymer b synthesized above, 1.2% by weight of melamine-formaldehyde resin, 2% by weight of quaternary ammonium butoxide as an antistatic agent, 0.07% by weight of a reactive silicon emulsion as a slipping agent, 0.05% by weight of a fluorine-based anionic surfactant, 0.1% by weight of polymethylmethacrylate having an average particle diameter of 3 μm and distilled water whose content was set to make the content of the whole components including the distilled water to be 100% by weight.

Subsequently, the composition for an image receiving layer was coated on one surface of a 100 μm thick PET film substrate (SKC MODEL SH71) using a meyer bar #4 and then heat-cured at 180° C. for 2 minutes to form an image receiving layer. After the heat-curing, the thickness of the image receiving layer was 0.4 μm.

Various physical properties of the thus-formed polymer film were measured and the results thereof were listed in Table 2.

Examples 2 and 3, and Comparative Examples 1 through 4

With the exception of the composition for an image receiving layer consisting of components listed in Table 1 being used, the image receiving layer was formed on the PET film substrate in the same manner as in Example 1.

Various physical properties of the thus-formed polymer film were measured and the results thereof were listed in Table 2.

TABLE 1

| | Components of composition for image receiving layer | | | | | |
|---|---|---|---|---|---|---|
| | Thermoplastic copolymer | Heat-curable copolymer | Antistatic agent | Slipping agent | Surfactant | Surface-roughening agent |
| Example 1 | 12 wt % of 40% emulsion of thermoplastic copolymer b | 1.2 wt % of melamine-form aldehyde resin | 2 wt % of quaternary ammonium butoxide | 0.07 wt % of reactive silicon emulsion | 0.05 wt % of fluorine-based anionic surfactant | 0.1 wt % of PMMA having average particle diameter of |

TABLE 1-continued

Components of composition for image receiving layer

| | Thermoplastic copolymer | Heat-curable copolymer | Antistatic agent | Slipping agent | Surfactant | Surface-roughening agent |
|---|---|---|---|---|---|---|
| Example 2 | 12 wt % of 40% emulsion of thermoplastic copolymer b | 1.2 wt % of urea-form aldehyde resin | 2 wt % of quaternary ammonium ethoxide | 0.05 wt % of reactive silicon emulsion | 0.05 wt % of fluorine-based anionic surfactant | 3 μm 0.1 wt % of PMMA having average particle diameter of 5 μm |
| Example 3 | 12 wt % of 40% emulsion of thermoplastic copolymer c | 1.2 wt % of diisocyanate resin | 2 wt % of quaternary ammonium hydroxide | 0.03 wt % of reactive silicon emulsion | 0.05 wt % of fluorine-based anionic surfactant | 0.1 wt % of PMMA having average particle diameter of 7 μm |
| Example 4 | 12 wt % of 40% emulsion of thermoplastic copolymer b | 1.2 wt % of melamine-form aldehyde resin | — | 0.07 wt % of reactive silicon emulsion (Solid concentration) | 0.05 wt % of fluorine-based anionic surfactant | 0.1 wt % of PMMA having average particle diameter of 3 μm |
| Example 5 | 12 wt % of 40% emulsion of thermoplastic copolymer c | 1.2 wt % of diisocyanate resin | — | 0.03 wt % of reactive silicon emulsion (Solid concentration) | 0.05 wt % of fluorine-based anionic surfactant | 0.1 wt % of PMMA having average particle diameter of 5 μm |
| Comparative Example 1 | 12 wt % of 40% emulsion of thermoplastic copolymer a | 1.2 wt % of melamine-form aldehyde resin | 2 wt % of Chemistat | 0.03 wt % of reactive silicon emulsion (Solid concentration) | — | 0.1 wt % of PMMA having average particle diameter of 0.3 μm |
| Comparative Example 2 | 12 wt % of 40% emulsion of thermoplastic copolymer a | 1.2 wt % of melamine-form aldehyde resin | 2 wt % of Resistat | 0.05 wt % of polytetra fluoro ethylene | — | 0.1 wt % of PMMA having average particle diameter of 0.1 μm |
| Comparative Example 3 | 12 wt % of neocryl BT-62[1] | — | 2 wt % of Resistat | 0.05 wt % of polysiloxane emulsion (Solid concentration) | — | — |
| Comparative Example 4 | 12 wt % of AC 503[2] | 1.2 wt % of diisocyanate resin | — | — | — | — |

[1] Neocryl BT-62, available by Zeneca;
[2] AC 503, available by Rohm & Haas)

TABLE 2

Various physical properties of polymer film

| | Toner adhesion property | Hardness of image receiving layer | Surface resistivity (Ω/□) | Coefficient of friction (Static/Dynamic) | Anti-blocking property | Transfer performance | Appearance |
|---|---|---|---|---|---|---|---|
| Example 1 | 4 | ◉ | $9 \times 10^9$ | 0.30/0.18 | Good | 0 | Good |
| Example 2 | 4+ | ◉ | $7 \times 10^9$ | 0.30/0.22 | Good | 0 | Good |
| Example 3 | 4+ | ○ | $7 \times 10^9$ | 0.31/0.25 | Good | 1 | Good |
| Example 4 | 4+ | ◉ | $1 \times 10^{13}$ or higher | 0.29/0.15 | Good | 1 | Good |

TABLE 2-continued

Various physical properties of polymer film

|  | Toner adhesion property | Hardness of image receiving layer | Surface resistivity (Ω/□) | Coefficient of friction (Static/Dynamic) | Anti-blocking property | Transfer performance | Appearance |
|---|---|---|---|---|---|---|---|
| Example 5 | 4+ | ⊙ | $1 \times 10^{13}$ or higher | 0.29/0.18 | Good | 2 | Good |
| Comparative Example 1 | 1 | X | $8 \times 10^{9}$ | 0.43/0.22 | Poor | 2 | Fine polka dots |
| Comparative Example 2 | 2 | X | $8 \times 10^{9}$ | 0.45/0.23 | Poor | 7 | Good |
| Comparative Example 3 | 1 | X | $1 \times 10^{10}$ | 0.76/0.25 | Poor | 9 | Good |
| Comparative Example 4 | 1 | X | $1 \times 10^{13}$ or higher | 0.88/0.53 | Fair | 10 or higher | Good |

As shown in Table 2, in Examples 1 through 3, the toner adhesion property, the hardness of the image receiving layer, the surface resistivity, the coefficient of friction, the anti-blocking property, the transfer performance and the film appearance are all excellent. In Comparative Example 1, since a thermoplastic copolymer a without acrylamide, hydroxyethylmethacrylate and acrylic acid was used and there is no reactive group in the antistatic agent used, three-dimensional cross-linked structure did not occur between the thermoplastic copolymer-heat-curable polymer-antistatic agent. Thus, the toner adhesion property was poor and the hardness of the image receiving layer was very weak. The dynamic coefficient of friction could be reduced by using the reactive silicon-based slipping agent. However, the average particle diameter of the surface-roughening agent was too small to exhibit a rough-surface treatment effect. Thus, the static coefficient of friction was considerably high and the anti-blocking property was poor. Also, when the fluorine-based anionic surfactant was not used, fine polka dots were produced in view of the film appearance.

In Comparative Examples 2 through 4, except the film appearance, improvement in the physical properties, in terms of toner adhesion property, hardness of the image receiving layer, anti-blocking property and the like was not observed.

As described above, the composition according to the present invention can form an image receiving layer having excellent toner adhesion properties, excellent antistatic properties, a low coefficient of friction, excellent anti-blocking properties and a pleasing appearance. Also, since the composition for the image receiving layer is a water-based composition, it is economical and can completely eliminate problems such as environmental pollution which may be caused in the case of using an organic solvent, which can threaten an operator's health or pose danger of fire. Thus, the polymer film having the image receiving layer formed from the composition has excellent toner adhesion properties, excellent antistatic properties, a low coefficient of friction, excellent anti-blocking properties and a pleasing appearance.

What is claimed is:

1. A composition for an image receiving layer comprising:
   2 to 20% by weight of a thermoplastic copolymer containing methylmethacrylate residue and butylacrylate residue;
   0.1 to 10% by weight of a heat-curable polymer for forming a cross link with the thermoplastic copolymer;
   0.01 to 0.5% by weight of a reactive silicon-based slipping agent having at least one functional group selected from the group consisting of a conjugate double bond, a free hydrogen group bonded with silicon (Si—H), an amino group and a hydroxy group;
   0.01 to 0.5% by weight of a fluorine-based anionic surfactant; and
   remainder of water.

2. The composition according to claim 1, further comprising 0.01 to 5% by weight of an antistatic agent having at least one functional group selected from the group consisting of an alkoxy group, a hydroxy group, an amino group and a conjugate double bond, based on the total weight of the composition.

3. The composition according to claim 1, wherein the thermoplastic copolymer contains 90 mol % or more of the methylmethacrylate residue and the butylacrylate residue in its molecular structure.

4. The composition according to claim 1, further comprising 0.05 to 5% by weight of cross-linked polymethylmethacrylate having an average particle diameter of 2 to 15 μm as a surface-roughening agent, based on the total weight of the composition.

5. The composition according to claim 1, wherein the thermoplastic copolymer contains 20 to 60 mol % of the methylmethacrylate residue and the butylacrylate residue in its molecular structure.

6. The composition according to claim 1, wherein the content of the heat-curable polymer is in the range of 5 to 40% by weight based on the weight of the thermoplastic copolymer.

7. The composition according to claim 1, wherein the thermoplastic copolymer contains 1 to 10 mol % of one residue selected from the group consisting of acrylamide residue, hydroxyethylmethacrylate residue and acrylic acid residue, in addition to the methylmethacrylate residue and the butylacrylate residue, in its molecular structure.

8. The composition according to claim 1, wherein the heat-curable polymer contains at least one functional group selected from the group consisting of an alkoxy group, a hydroxy group, an amino group, a amide group, a cyano group and a water-soluble blocked isocyanate group.

9. The composition according to claim 1, wherein the heat-curable polymer is at least one selected from the group consisting of a melamine-formaldehyde resin, a urea-formaldehyde resin and a water-soluble blocked diisocyanate resin.

10. A polymer film comprising:
    a polymer film substrate; and
    an image receiving layer including 25 to 85% by weight of a thermoplastic copolymer containing methylmethacrylate residue and butylacrylate residue, 5 to 50% by weight of a heat-curable polymer for forming a cross link with the thermoplastic copolymer, 0.1 to 10% by weight of a reactive silicon-based slipping agent having at least one functional group selected from the group consisting of a conjugate double bond, a free hydrogen group bonded with silicon (Si—H), an amino group, and a hydroxy group and 0.1 to 10% by weight of a fluorine-based anionic surfactant.

11. The polymer film according to claim 10, further comprising 15 to 30% by weight of an antistatic agent having at least one functional group selected from the group consisting of an alkoxy group, a hydroxy group, an amino group and a conjugate double bond, based on the total weight of the composition.

12. The polymer film according to claim 10, wherein the thermoplastic copolymer contains 90 mol % or more of the methylmethacrylate residue and the butylacrylate residue in its molecular structure.

13. The polymer film according to claim 10, further comprising 0.3 to 3% by weight of cross-linked polymethylmethacrylate having an average particle diameter of 2 to 15 μm as a surface-roughening agent, based on the total weight of the composition.

14. The polymer film according to claim 10, wherein the thermoplastic copolymer contains 20 to 60 mol % of the methylmethacrylate residue and the butylacrylate residue in its molecular structure.

15. The polymer film according to claim 10, wherein the content of the heat-curable polymer is in the range of 5 to 40% by weight based on the weight of the thermoplastic copolymer.

16. The polymer film according to claim 10, wherein the thermoplastic copolymer contains 1 to 10 mol % of one residue selected from the group consisting of acrylamide residue, hydroxyethylmethacrylate residue and acrylic acid residue, in addition to the methylmethacrylate residue and the butylacrylate residue, in its molecular structure.

17. The polymer film according to claim 10, wherein the heat-curable polymer contains at least one functional group selected from the group consisting of an alkoxy group, a hydroxy group, an amino group, an amide group, a cyano group and a water-soluble blocked isocyanate group.

18. The polymer film according to claim 17, wherein the heat-curable polymer is at least one selected from the group consisting of a melamine-formaldehyde resin, a urea-formaldehyde resin and a water-soluble blocked diisocyanate resin.

19. The polymer film according to claim 10, wherein the polymer film substrate is at least one selected from the group consisting of a polyester film, a polycarbonate film, a polyimide film, a polysulfone film and cellulose trivinylacetate film.

* * * * *